(12) United States Patent
Okabe

(10) Patent No.: US 8,647,791 B2
(45) Date of Patent: Feb. 11, 2014

(54) SEAL STRUCTURE FOR FUEL CELL AND METHOD FOR PRODUCING SAME

(75) Inventor: Tatsuya Okabe, Fujisawa (JP)

(73) Assignee: NOK Corporation, Tokyo (JP)

( * ) Notice: Subject to any disclaimer, the term of this patent is extended or adjusted under 35 U.S.C. 154(b) by 205 days.

(21) Appl. No.: 13/312,164

(22) Filed: Dec. 6, 2011

(65) Prior Publication Data

US 2012/0122010 A1  May 17, 2012

Related U.S. Application Data

(63) Continuation of application No. 11/795,604, filed as application No. PCT/JP2005/017789 on Sep. 28, 2005, now abandoned.

(30) Foreign Application Priority Data

Jul. 15, 2005 (JP) .................................. 2005-206486

(51) Int. Cl.
*H01M 2/08* (2006.01)
*H01M 2/14* (2006.01)

(52) U.S. Cl.
USPC ............................. 429/469; 429/508; 429/509

(58) Field of Classification Search
None
See application file for complete search history.

(56) References Cited

U.S. PATENT DOCUMENTS

| 6,057,054 A * | 5/2000 | Barton et al. ................. 429/483 |
| 6,475,656 B1 | 11/2002 | Koschany et al. .............. 429/30 |
| 2003/0104262 A1 | 6/2003 | Kuroki et al. ................... 429/36 |
| 2004/0096730 A1 | 5/2004 | Kuroki et al. ................... 429/44 |
| 2004/0151969 A1* | 8/2004 | Ian Joos et al. ................. 429/35 |
| 2004/0191604 A1 | 9/2004 | Artibise |

FOREIGN PATENT DOCUMENTS

| JP | 2001-332275 | 11/2001 |
| JP | 2002-042838 | 2/2002 |
| JP | 2003-007328 | 1/2003 |
| JP | 2003-068332 | 3/2003 |
| JP | 2004-063295 | 2/2004 |

* cited by examiner

*Primary Examiner* — Barbara Gilliam
*Assistant Examiner* — Adam A Arciero
(74) *Attorney, Agent, or Firm* — Jacobson Holman PLLC

(57) ABSTRACT

In order to prevent decrease of power generation due to a narrow MEA reaction region, an MEA (2) arranged between a pair of separators (5), a rubber sheet (6) arranged on its planar extension at the outer circumferential side of the MEA (2), and a gasket-like lip line (7) formed at the opposite sides of the rubber sheet (6) integrally therewith to closely contact with the separators (5) are provided, a rubber impregnated portion (8) for integrating the rubber sheet (6) with the MEA (2) by impregnation of a part of rubber composing the rubber sheet (6) into the GDL (4) constituting the MEA (2) is provided at the circumferential edge of the MEA (2), and a GDL constricted portion (9) for regulating the rubber impregnated portion is provided at the immediately inner circumferential side of the rubber impregnated portion (8) in the plane of the MEA (2).

5 Claims, 6 Drawing Sheets

SEAL STRUCTURE FOR FUEL CELL AND METHOD FOR PRODUCING SAME

This is a Continuation application of application Ser. No. 11/795,604, filed Jul. 19, 2007 now abandoned, which in turn is national stage of the International Application No. PCT/JP2005/017789 filed Sep. 28, 2005 and published in Japanese.

BACKGROUND OF THE INVENTION

1. Field of the Invention

The present invention relates to a seal structure as a constituent of the fuel cell and relates to a method for producing the seal structure.

2. Description of the Conventional Art

As a conventional seal structure for sealing gas or sealing a cooling passage in each cell of the fuel battery stacks, such a structure that a gasket made of an elastic member such as liquid rubber is formed on a separator is most commonly used (refer to Patent Documents 1, 2).

On the other hand, such a structure that a gasket is formed on a MEA (Membrane-Electrode Assembly) disposed between a pair of the separators has been proposed as follows:

(1) A seal structure wherein a resin film is applied or attached onto a peripheral portion of the MEA, and a gasket is formed on the resin film (refer to Patent Document 3), or (2) A seal structure wherein gaskets are formed on both surfaces of a GDL (Gas Diffusion Layer) constituting an MEA by the injection molding of liquid rubber, and a part of the liquid rubber is impregnated within a porous structure of the GDL (refer to Patent Documents 4, 5).

Such conventional structures may fully achieve the desired objective to serve as sealing members. However, as for the former one (1), there is a problem that a number of component parts and a number of production processes are increased due to the necessity of employing the resin film, and as for the latter one (2), there is a problem that an undue pressure is applied to the GDL since compressive load of gasket is directly applied onto the GDL when a stack is assembled.

To eliminate the above-mentioned drawbacks, it is preferable to provide a structure that a rubber sheet is formed on a plane extending from an MEA at the outer peripheral side of the MEA, instead of surfaces of GDLs or the MEA, by injection molding of liquid rubber, a part of the liquid rubber is impregnated into a peripheral portion of a GDL to integrate the MEA and the rubber sheet, and lip lines having a gasket configuration are formed integrally on the respective surfaces of the rubber sheet. With such structure that the MEA, the rubber sheet and the lip lines are arranged along one plane, the resin film can be omitted and can prevent the compressive load of gasket from being directly applied onto the GDL.

With such flat arrangement, however, the liquid rubber is apt to be impregnated deeply in the plane directions of the GDL, since it is difficult to properly control the width (lateral length) of the impregnated area when a part of the liquid rubber is impregnated into the peripheral portion of the GDL in the manufacturing process thereof. As a result, there is a risk that the reaction area of the MEA, which is to be set widely at a central area of the GDL, becomes narrower to deteriorate the power generation of the fuel cell.

Patent Document 1: Japanese unexamined patent publication No. 2001-332275
Patent Document 2: Japanese unexamined patent publication No. 2004-63295
Patent Document 3: Japanese unexamined patent publication No.2003-7328
Patent Document 4: Japanese unexamined patent publication No. 2003-68332
Patent Document 5: PCT publication WO 2002/043172

The present invention is made by taking the above-mentioned drawbacks of the conventional art into consideration, and an object of the present invention is to provide a seal structure for a fuel cell with liquid rubber being impregnated into peripheral portions of GDLs constituting an MEA to form lip lines, wherein the width of rubber impregnated area can be properly controlled, and an MEA reaction area can be prevented from being narrowed to cause deterioration of power generation, and a method for producing the seal structure.

Further, in addition thereto, another object of the present invention is to provide a seal structure for a fuel cell, wherein the structure itself has capability for controlling the compressibility ratio of the lip lines, and thereby the lip lines can be closely contacted with separators in an appropriate posture, and a method for producing the seal structure.

SUMMARY OF THE INVENTION

In order to achieve the above-mentioned object, in accordance with a first aspect of the present invention, there is provided a seal structure for a fuel cell comprising an MEA provided between a pair of separators; a rubber sheet provided on a plane extending from the MEA and at the outer peripheral side of the MEA; lip lines which have a gasket configuration, are integrally formed on the respective surfaces of the rubber sheet and are closely contacted with the separators; rubber impregnated portions which are provided at the periphery of the MEA to integrate the rubber sheet and the MEA by a part of rubber constituting the rubber sheet being impregnated into GDLs constituting the MEA; and GDL narrowed portions provided immediately inner peripheral side of the rubber impregnated portions in a plane with the MEA to define a rubber impregnated area.

Further, in accordance with a second aspect of the present invention, there is provided a seal structure for the fuel cell, wherein, in addition to the first aspect, distance-restricting portions are formed integrally with the rubber sheet at both or at least one of inner peripheral side and outer peripheral side of the lip lines to define a distance between the separators by the portions being held by a pair of the separators when assembling a stack.

Further, in accordance with a third aspect of the present invention, there is provided a method for producing the seal structure for the fuel cell as recited in the first and second aspects mentioned above, comprising the steps of preparing a mold comprising split molds which have step-like pressing portions facing to each other in order to form the GDL narrowed portions by compressing of parts of the GDLs to reduce thickness of the parts at a time of mold clamping; inserting the MEA, with which the rubber sheet is to be molded, into the mold; and carrying out injection molding to form the rubber sheet under a condition of the parts of the GDLs being compressed to reduce the thickness by the pressing portions formed in the mold.

Further, in accordance with a fourth aspect of the present invention, there is provided a method for producing the seal structure for the fuel cell according to the third aspect mentioned above, wherein, in addition to the third aspect, the GDLs are compressed by the pressing portions of the molds at a compressibility ratio of 30-50%, while being compressed by portions other than the pressing portions of the molds at a compressibility ratio of 0-20%.

In the seal structure according to the first aspect of the present invention, since the GDL narrowed portions to define the rubber impregnated area is formed at immediately inner peripheral side of the rubber impregnation portions in the plane of MEA, the impregnation of rubber component is stopped by the GDL narrowed portion.

As described in the method for producing the seal structure according to the third aspect of the invention, since the GDL narrowed portions are formed at parts of the GDLs by compression by the step-like pressing portions provided at facing portions of the split molds for injection molding to reduce thickness of the GDLs in parts when the molds are clamped, the volume of micro cavities of GDL porous structure is reduced at the GDL narrowed portions. As a result, resistance to impregnation is increased and thereby it becomes difficult for the liquid rubber to pass through the porous GDLs at the GDL narrowed portions.

As mentioned in the fourth aspect of the present invention, since the GDLs are compressed by the pressing portions of the molds at a relatively large compressibility ratio of 30-50% and compressed by the portions other than the pressing portions of the molds at a relatively small compressibility ratio of 0-20%. Thus, the liquid rubber becomes hard to pass through the porous area so compressed by the pressing portions. If the compressibility ratio is less than 30%, sufficient narrowing effect cannot be obtained, on the other hand, if the compressibility ratio exceeds 50%, there is the possibility that the excessive load will be applied to the GDLs.

Further in the seal structure of the present invention, it is possible to attain sealing capability by bringing the lip lines integrally formed with the respective surfaces of the rubber sheet and held between a pair of the separators to closely contact with the separators. However, the structure formed by the mere provision of the lip lines is too flexible to properly receive the compressive load by a pair of the separators when assembling of a stack. As a result, there is concern that the compressibility ratio of the rubber sheet becomes excessive to cause collapse of the lip lines beyond expectation.

Consequently, in the seal structure as recited in the second aspect of the present invention, distance-restricting portions to define a distance between the separators, which are to be held by a pair of the separators when assembling into a stack, are formed integrally with the rubber sheet at both or at least one of inner peripheral and outer peripheral sides of the lip lines, and the compressibility ratio of the rubber sheet is properly controlled by the provision of the gap-restricting portions.

The advantageous effects of the present invention are as follows.

According to the seal structure for a fuel cell and the method for producing the seal structure as recited in the first, third and fourth aspects of the present invention, since impregnation of liquid rubber is stopped by the GDL narrowed portions formed integrally with the GDLs, it is possible to properly controlling the width of rubber impregnated areas of the GDLs. Thus, it is possible to prevent, as intended, the MEA reaction area from being narrowed to cause deterioration of power generation capacity.

Further, in addition to this, according to the seal structure for the fuel cell and the method for producing the seal structure as recited in the second and third aspect of the present invention respectively, since a distance between a pair of the separators when a cell stack are assembled is defined by the distance-restricting portions provided along with the lip lines of the rubber sheet, it is possible to properly control the compressibility ratio of the rubber sheet by a pair of the separators. Thus, the lip line can be closely contacted with the separators in an appropriate posture. As a result, stable sealing performance can be attained as intended.

Figure 1:
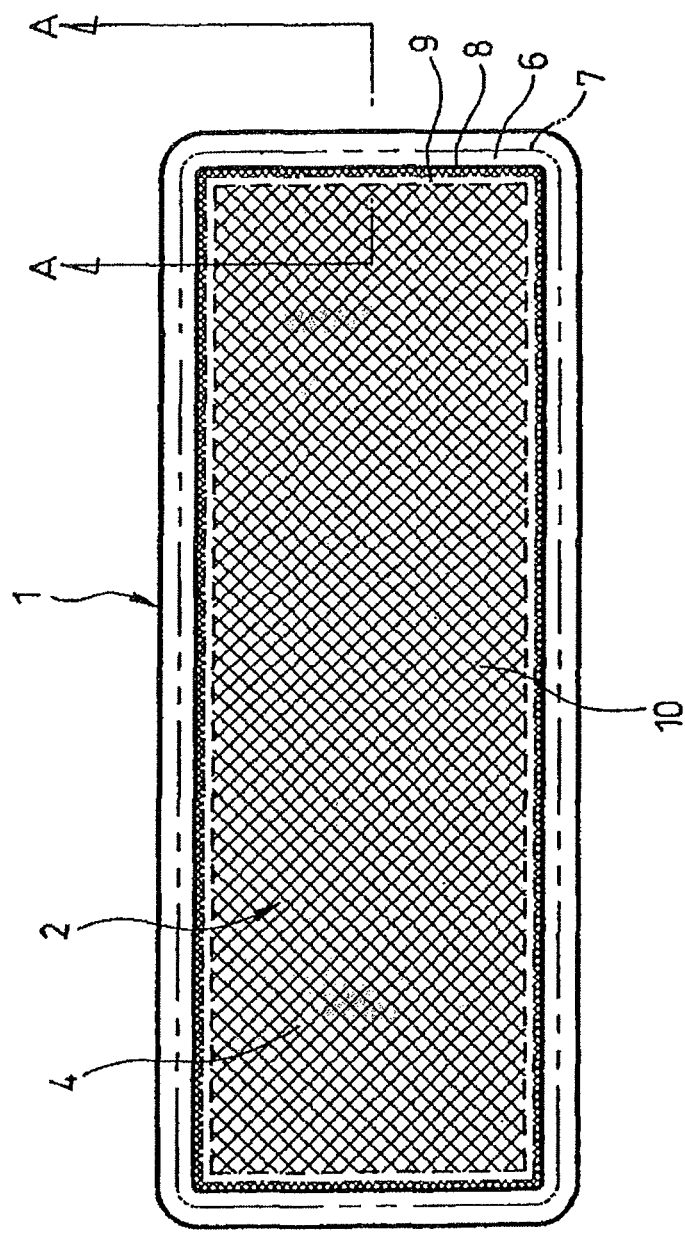
FIG. 1 is a plan view of a seal structure for a fuel cell in accordance with a first embodiment of the present invention.

EXPLANATION OF THE REFERENCE NUMERALS 1 seal structure
2 Membrane-Electrode Assembly (MEA)
3 electrolyte membrane
4 Gas Diffusion Layer (GDL)
5 separators
6 rubber sheet
7 seal lip line
8 rubber impregnated area
9 squeezed portion of GDL
10 reaction electrode portion of MEA
11, 12 gap-restriction portions
13, 14 groove-like space
21 molds for injection molding
22 upper mold (split mold)
23 lower mold (split mold)
24 rubber sheet forming space
25 pressing portion or protrusion
26 injection gate
27 seal lip line forming space

DETAILED DESCRIPTION OF PREFERRED EMBODIMENT

The present invention includes the following embodiments.

(a) In the integral structure of MEA and gasket which is provided with sealing capability by impregnating and adhering a rubber sheet having a less thickness than the distance between the separators, at a time of cell assembling, to the entire periphery of the MEA by means of injection molding of liquid rubber, and by forming lip lines having a gasket configuration on the respective surfaces of the rubber sheet, it is required to retain a sufficiently broad area of impregnation at the side of GDLs where the rubber sheet and the GDL end portions are bonded by impregnation with each other, in order to prevent peeling off of the rubber sheet from the GDLs at a time of the cell assembling. On the other hand, there is concern that power generation capacity is deteriorated due to the reduction of reaction area in case that the impregnation area is extended up to the reaction area of MEA.

Then, to cope with the above-mentioned concern, there is provided a seal structure by means of such a mold structure that compressibility ratio of the GDLs during the molding process is brought to be approximately 0-20% at the rubber impregnated area to make resistance to impregnation relatively small, resulting in a structure with the liquid rubber being sufficiently impregnated, while compressibility ratio of the GDL is brought to be approximately 30-50% at an area between the rubber impregnated area and reaction area to make resistance to impregnation relatively large, resulting in a structure capable of preventing the liquid rubber from being impregnated into the reaction area.

(b) In the integrated structure of MEA and gasket wherein the rubber sheet is formed on the periphery of the MEA, and the lip lines having a gasket configuration are formed on the rubber sheet, a mold for rubber impregnated portion to adhere the rubber sheet and GDL is structured such that compressibility ratio of the GDL is set to be approximately 0-20% at the rubber impregnated area for easy impregnation, while compressibility ratio of the GDL is set to be approximately 30-50% in an area at the inner peripheral side of the impregnated area to prevent the impregnation from reaching to the reaction area.

(c) There is provided a rubber impregnated area that is extended up to approximately 3 mm from the periphery of the GDL, and compressibility ratio of the GDL is set to be approximately 0-20%. Also, there is provided an area having a width of approximately 2 to mm between the rubber impregnated area and the reaction area and compressibility ratio of the GDL in this area is set to be approximately 30-50% to prevent the impregnation from reaching to the reaction area.

(d) According to the above-mentioned structure of (a), (b) or (c), in the integrated structure of MEA and gasket, a sufficient bond strength between the rubber sheet provided on the peripheral of the MEA and the GDL is ensured and the liquid rubber is prevented from being impregnated up to the reaction rear, thereby the deterioration of the power generation capacity is prevented.

Next, a description will be given of embodiments in accordance with the present invention with reference to the accompanying drawings.

First Embodiment

Figure 2:
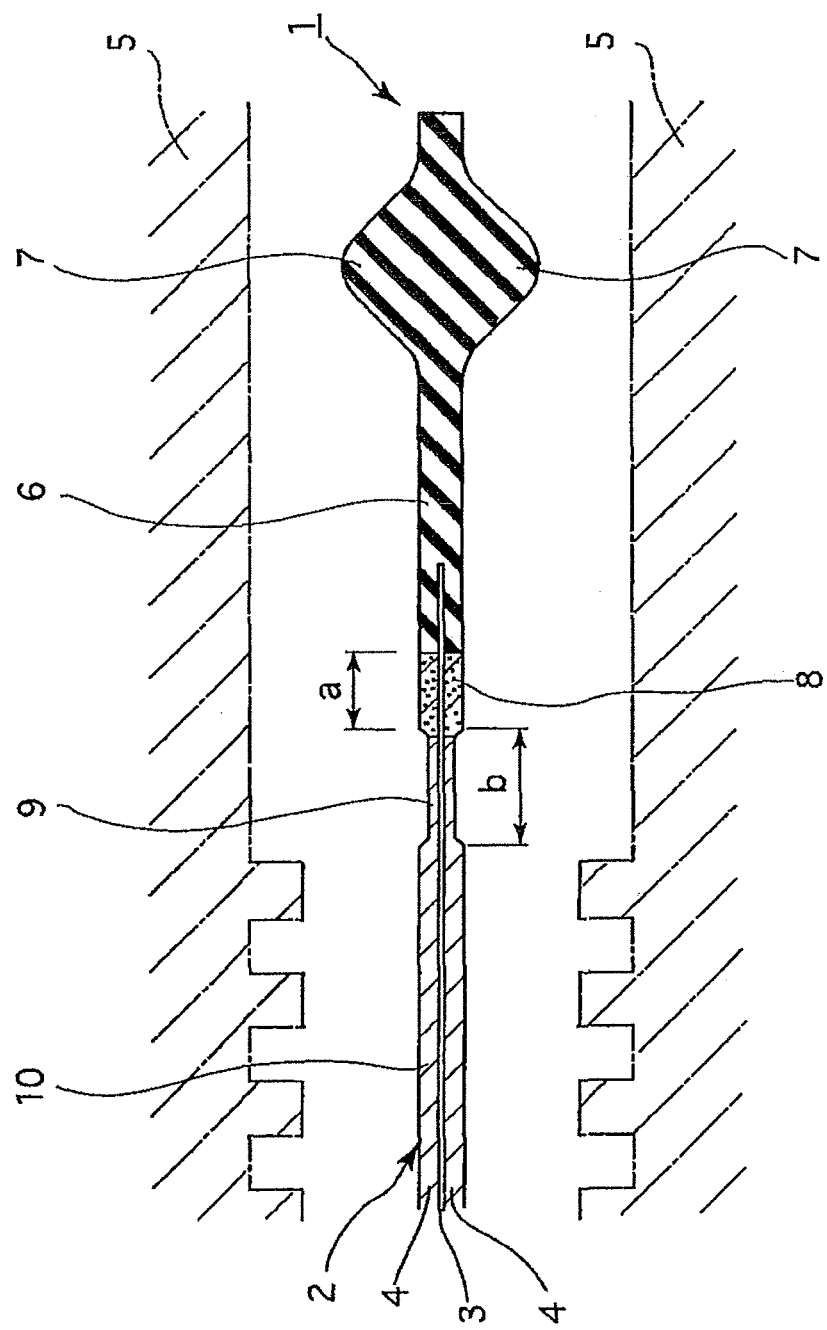
FIG. 2 is an enlarged cross sectional view along a line A-A in FIG. 1.

FIG. 1 shows a plan view of a seal structure 1 for a fuel cell according to the first embodiment of the present invention, and FIG. 2 shows an enlarged cross-sectional view taken along a line A-A in FIG. 1. The seal structure 1 in accordance with the embodiment is configured in the following manner.

As shown in FIG. 2, gas diffusion layers (GDLs) 4 are laid on the respective sides of an electrolyte membrane 3 (on both surfaces of the membrane, i.e. upper- and lower-side in FIG. 2) to form a laminated structure constituting a membrane-electrode assembly 2 (MEA), and the MEA 2 is held between a pair of separators 5.

The seal structure 1 in accordance with the first embodiment of the present invention integrally comprises the MEA 2 held between a pair of the separators, a rubber sheet 6 provided on a plane extending from the MEA 2 and at the outer peripheral side of (right side in FIG. 2), and lip lines (also referred to as seal lip lines or gaskets) 7 having gasket configuration, being formed integrally on the respective surfaces of the rubber sheet 6 and being closely contacted with a pair of the separators 5, wherein a part of liquid rubber constituting the rubber sheet 6 is impregnated into the GDLs 4 having a porous structure constituting the MEA 2 during molding process to form rubber impregnation portions (also referred to as rubber impregnated area) 8 along the periphery of the MEA 2 with a predetermined width a (for example, a=3 mm), so as to provide an integral structure of the rubber sheet 6 and MEA 2.

Further, there are provided GDL narrowed portions (also referred to as an impregnation restricting area) 9 in a plane of MEA 2 and immediately inner peripheral side of the rubber impregnation portions 8 (left side in FIG. 2) for restricting the liquid rubber impregnated area with a predetermined width b (for example, b=2 to 5 mm) along the whole peripheries of the GDLs. The GDL narrowed portions 9 are formed by strongly pressing a part of the GDLs 4 to largely reduce thickness of the GDLs 4 and thereby the MEA 2, and the volume of the micro cavities of the porous structure in the GDLs 4 is reduced corresponding to the reduced thickness of the MEA 2, thereby the liquid rubber does not easily pass through the narrowed portions 9 during the molding process.

Further, a reaction area 10 is provided in a plane with the MEA 2 and inner peripheral side of the GDL narrowed portions 9.

The above-mentioned seal structure 1 is produced in the following manner.

Figure 3:
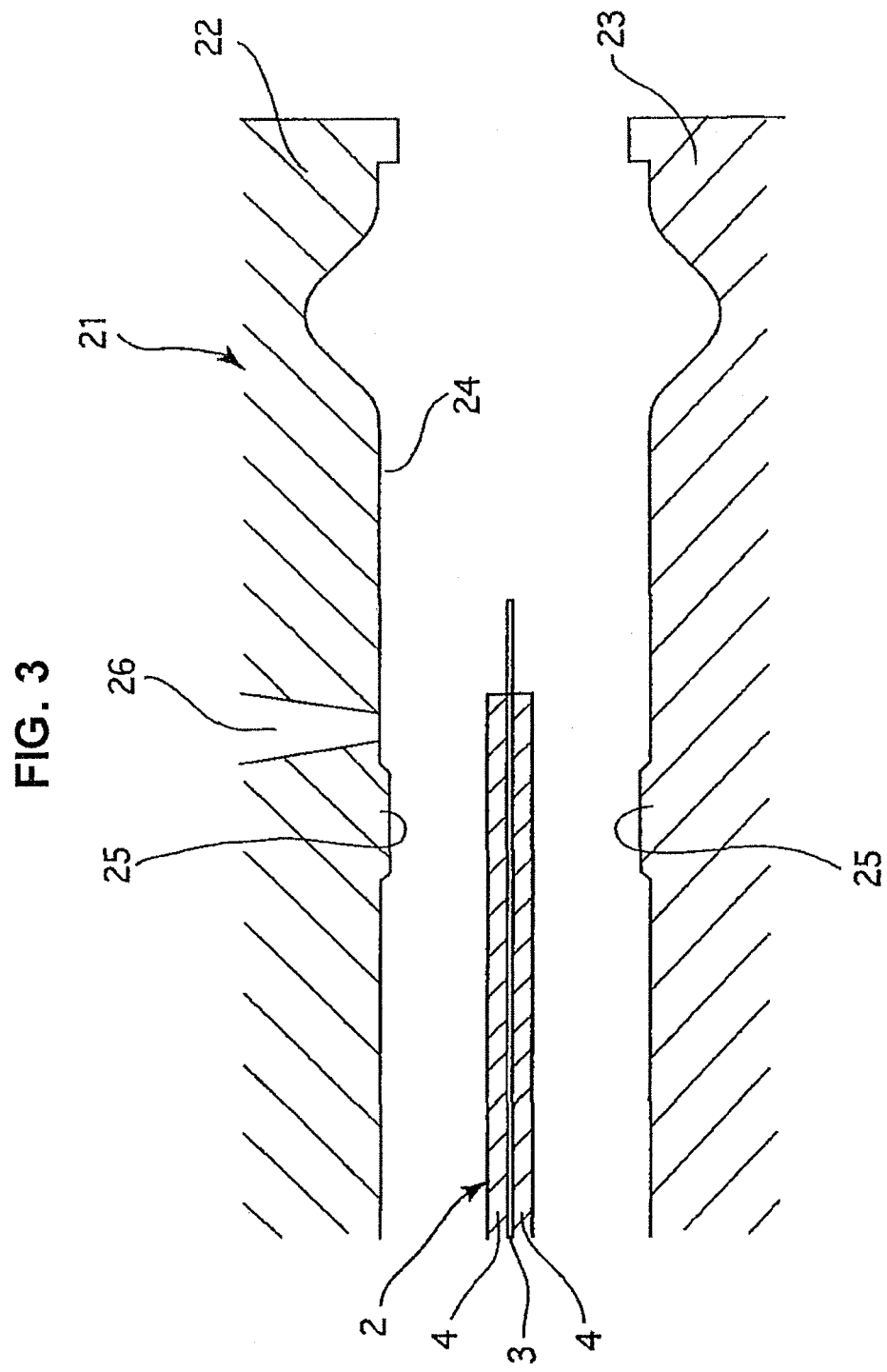
FIG. 3 is a cross sectional view of a main portion showing a method of producing the seal structure (before mold clamping)

At first, in the producing process, a mold 21 for injection molding is employed as shown in FIG. 3.

Figure 4:
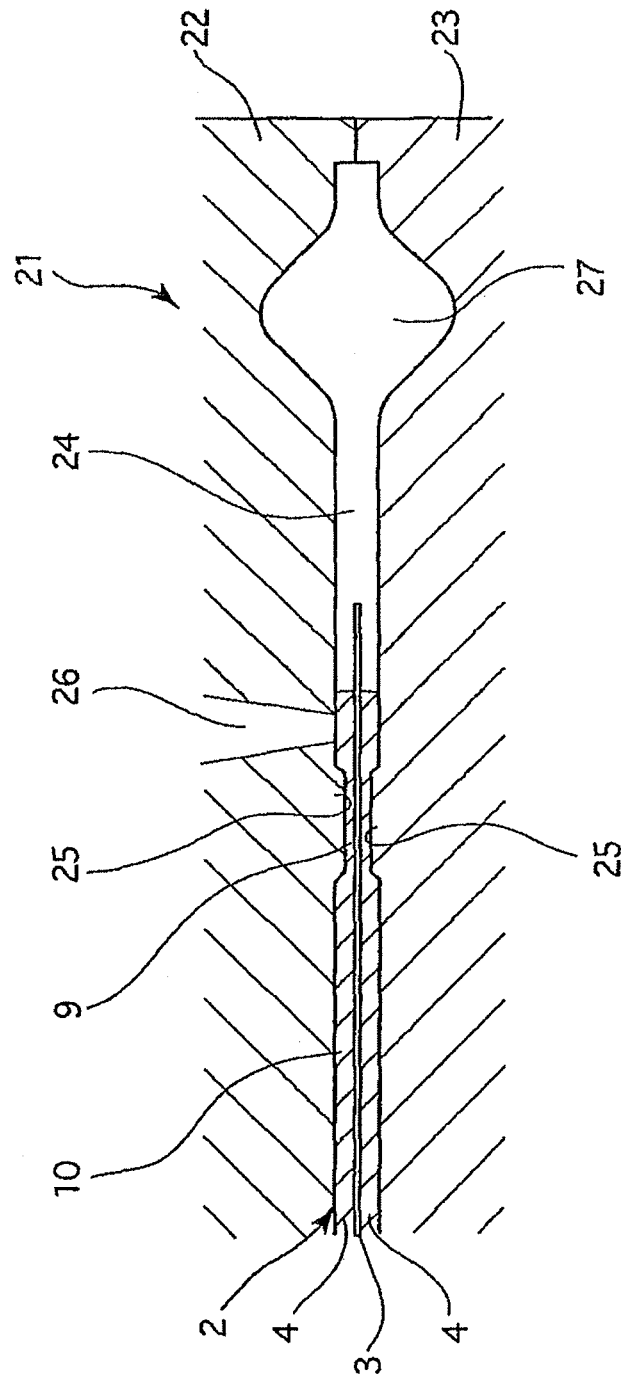
FIG. 4 is a cross sectional view of a main portion showing a method of producing the seal structure (after mold clamping)

The mold 21 comprises a pair of molds facing to each other, i.e. an upper mold 22 and lower mold 23, as shown in FIGS. 3 and 4. The rubber sheet 6 is formed by injection molding with liquid rubber as the molding material in a state of the MEA 2 being inserted into a cavity space 24 defined between the inner faces of the molds 22 and 23.

Further, there are provided step-like pressing portions 25 at positions corresponding to the narrowed portions 9 of the MEA 2 to be inserted into a predetermined position in the cavity space 24. The pressing portions 25 comprise a pair of protrusions facing to each other, i.e. upper protrusion and lower protrusion. The GDLs 4 disposed between the pressing portions 25 are compressed by clamping of the molds, causing a large reduction in thickness of the GDLs 4 and consequently MEA 2, thereby thin GDL narrowed portions 9 is formed in the MEA 2.

A compressibility ratio of the GDLs by the pressing portions 25 is set to be approximately 30-50%, while a compressibility ratio of the GDLs by other portions than the pressing portions 25 is set to be approximately 0-20%, i.e. the compressibility ratio at the pressing portions is set to be relatively larger than that at the other portions.

Further, there is provided an injection gate 26 in the upper mold 22 for injection of liquid rubber into the forming space 24 at a position corresponding to the rubber impregnated area 8 in the MEA 2 inserted in a predetermined position of the forming space 24.

When the mold 21 is clamped in the state of the MEA 2 being inserted into the forming space 24, the narrowed portions 9 are formed in the MEA 2 by the pressing portions 25, as shown in FIG. 4. Next, when liquid rubber is injected through the injection gate 26, the liquid rubber is smoothly impregnated into the GDLs 4 to form the rubber impregnated portions 8, and also filled smoothly in a forming space 27 for formation of rubber sheet 6 and lip lines 7 at the outer peripheral side of the rubber impregnated portions 8, since the GDL compressibility ratio for the region corresponding to the rubber impregnated portions 8 is set to be relatively small.

On the other hand, since the compressibility ratio for the narrowed portions 9 at the inner peripheral side of the rubber impregnated portions 8 is set to be relatively large, the liquid rubber is hardly impregnated into the narrowed portions 9. Therefore, the width of the liquid rubber impregnation area can be set approximately to an intended value (the above-mentioned width a=3 mm in this embodiment), thereby the rubber impregnated area is prevented from extending to the inner peripheral side.

Further, after completion of the molding process, the narrowed portions 9 becomes to be fine in its inner structure and rigid, since the volume of micro cavities of the porous structure is reduced as mentioned above.

Second Embodiment

Figure 5:
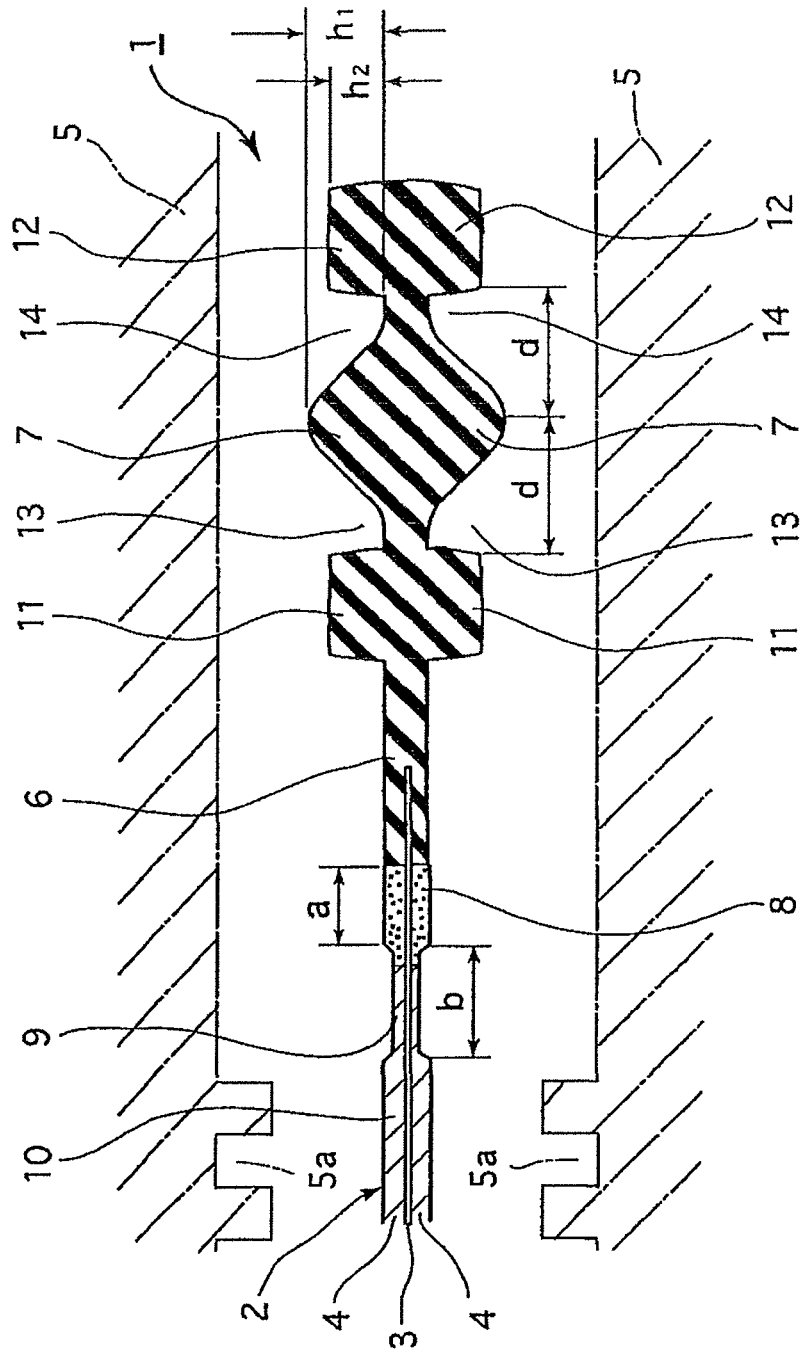
FIG. 5 is a cross sectional view showing a main portion of a seal structure for a fuel cell in accordance with a second embodiment of the present invention.

FIG. 5 shows a cross sectional view showing a main portion of a seal structure for a fuel cell in accordance with a second embodiment of the present invention, and a seal structure 1 in accordance with the embodiment is configured in the following manner.

GDLs 4 are laid on the respective sides of an electrolyte membrane 3 to form a laminated structure constituting an MEA 2, and the MEA 2 is held between a pair of separators 5.

The seal structure 1 of this embodiment integrally comprises the MEA 2 provided between a pair of the separators 5, a rubber sheet 6 provided on a plane extending from MEA 2 and at the outer peripheral side of the MEA 2, and lip lines 7 having a gasket-like configuration, being formed integrally on the respective surfaces of the rubber sheet 6 and being closely contacted with the separators 5. When molding the rubber sheet 6, rubber impregnated portions 8 are formed along the whole peripheral edge of the MEA 2 having a predetermined width a (for example, a=3 mm) by impregnating a part of liquid rubber constituting the rubber sheet 6 into the GDLs 4 having a micro porous structure and constituting the MEA 2, thereby the rubber sheet 6 is formed integrally with the MEA 2.

Further, there is provided GDL narrowed portions 9 in a plane with the MEA 2 and immediately inner peripheral side of the rubber impregnated portions 8 (left side in FIG. 5) for restricting the liquid rubber impregnated area with a predetermined width b (for example, b=2 to 5 mm) along the whole periphery edge of the GDL 4.

The narrowed portions 9 are formed by strongly pressing parts of the GDLs 4 to largely reduce thickness of GDLs 4, and thereby the MEA 2, and the volume of the micro cavities of the porous structure in the GDLs 4 is reduced corresponding to the reduced thickness of the MEA 2, thereby the liquid rubber does not easily pass through the narrowed portions 9 during the molding process.

Further, a reaction area 10 is provided in a plane with the MEA 2 and at the inner peripheral side of the GDL narrowed portions 9.

Furthermore, distance restricting portions 11 and 12 (also referred to as sub lip lines or rubber spacers or load-receiving portions) are integrally formed at the inner peripheral side and outer peripheral side of the seal lip line 7 provided on the respective surfaces of the rubber sheet 6 to provide a distance between the separators 5 by the portions being held by a pair of the separators 5 when assembling into a stack.

Since the lip lines 7 are required to have long-standing durability in the desired sealing capability, the shape is controlled so that large surface pressure is brought out when compressed. To be more precise, the lip lines 7 are formed in a chevron or triangular sectional shape having a sharp tapered end, and have a height h1 larger than a height h2 of the distance restricting portions 11 and 12 (h1>h2).

On the other hand, the distance restricting portions 11 and 12 are required to be controlled so that the lip lines 7 are given with desired compressibility, that is, made to be a desired height dimension against a compressive load. Therefore, the shape is controlled so that deformation is hardly generated against the compressive load. To be more precise, the distance restricting portions 11 and 12 are formed in a trapezoidal or rectangular sectional shape each having flat end portion, and have the height h2 smaller than the height h1 of the lip lines 7 (h1>h2). The distance restricting portions 11 and 12 are set to have same height h2, with the flat end portions being on a same plane.

The degree of hardness of rubber elastic body comprised of the cured liquid rubber is set to be relatively soft to the extent of 40 to 50, and the compressibility ratio of the lip lines 7 is set to be 30-50%. Accordingly, there are provided groove-like spaces 13 and 14 between the lip lines 7 and the inner and outer peripheral side distance restricting portions 11 and 12 respectively, serving as clearance grooves to allow the deformation of the lip lines 7 when compressed. The volume of the groove-like spaces 13 and 14 is preferable to be as small as possible so that the distance restricting portions 11 and 12 serve as supports to prevent falling down of the lip lines 7. A distance d between the center of the seal lip line 7 and the end of the distance restricting portion 11 or 12 is set to be 2-5 mm by an actual size.

Figure 6:
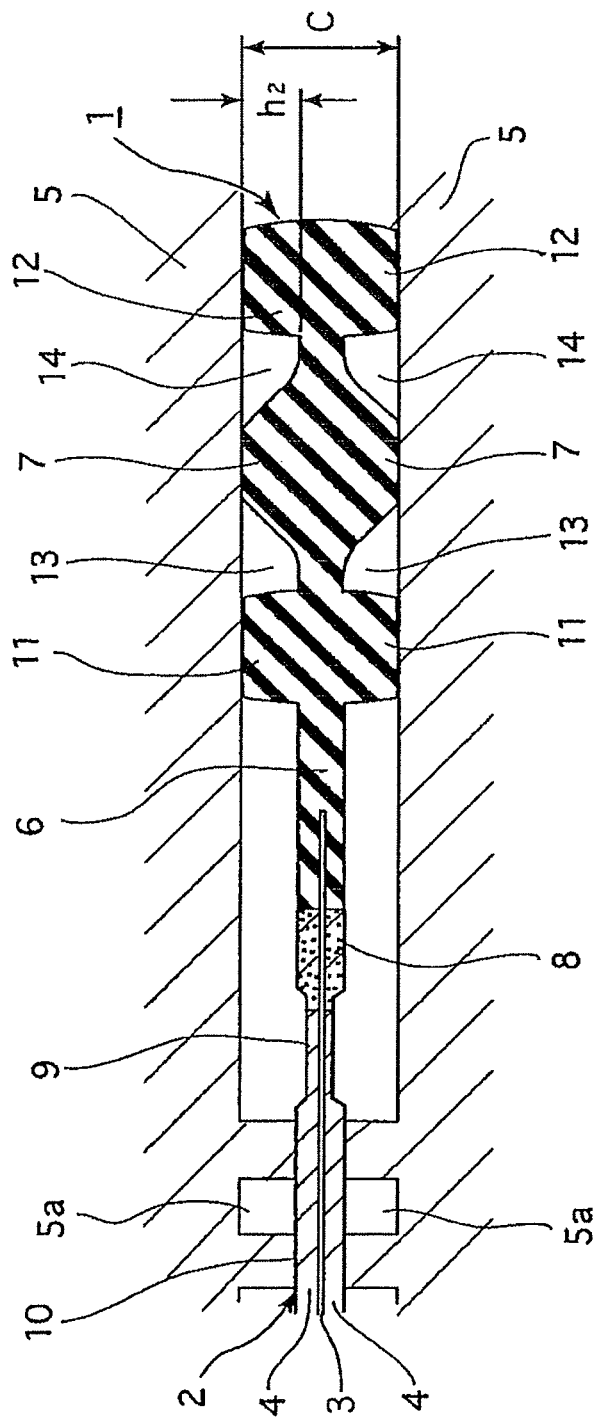
FIG. 6 is a cross sectional view of a main portion showing an assembling state of the seal structure.

FIG. 5 shows the seal structure in accordance with this embodiment at an initial state before assembling into a fuel cell stack. When assembled into a stack from this state, a compressive load is applied in the thickness direction to the seal structure so that the lip lines 7 held between a pair of the separators 5 are compressed and deformed as shown in FIG. 6 to be closely contacted with the inner surfaces of the separator 5 by the reactive force of compression. When the compressive load is applied subsequently in the thickness direction to the seal structure so that the separators 5 make contact with the distance restricting portions 11 and 12, a distance C between the separators 5 is regulated, since the distance restricting portions 11 and 12 are controlled so that the shape thereof is not deformed against the applied compressive load. As a result, the compressibility ratio of the lip lines 7 is so controlled as to be enough to exhibit the sealing performance. Also, the distance restricting portions 11 and 12 serve as spacers held between a pair of the separators 5 to halt the displacement of the separators 5 in such a direction as to shorten the distance C.

Accordingly, the seal structure 1 provided with the distance restricting portions 11 and 12 makes it possible to control the compressibility ratio of the lip lines 7, and such the structure makes it possible to exert the following effects.

(1) First, since the seal structure 1 is not constructed such that the compressibility of the lip lines 7 is controlled by a complicated sectional shape of the separators 5, as can be found in a conventional art, it is possible to simplify the sectional shape of the separators 5 and to provide thin structure. As shown in FIG. 5, the inner surface of each separator 5 may be formed in a complete flat face except for the inner surface corresponding to the groove-like passage 5a.

(2) Further, since the seal structure 1 is not constructed such that a distance between a pair of the separators is regulated by dedicated spacers interposed therebetween, it is possible to prevent increase in the number of parts and assembling processes.

Furthermore, the following functions and effects can also be achieved by the above-mentioned seal structure 1.

(3) Since the distance restricting portions 11 and 12 are provided immediately next to the lip lines 7, the distance restricting portions 11 and 12 serve as supports for the lip lines 7, thereby generation of falling down of the lip lines can be suppressed.

(4) Since the distance restricting portions 11 and 12 are formed integrally with the rubber sheet 6 and formed by rubber elastic body, when the integral structure is compressed, rising degree of the stress can be made moderate as compared with that of distance restricting portions formed by a rigid material such as hard resin. Therefore, parts breakage prevention effect can be expected by the buffering effect due to the elasticity of the distance restricting portions.

(5) Further, the seal structure when assembled as a stack is expected to have an anti-vibration effect due to the elasticity of rubber. The anti-vibration effect is a key factor when the fuel cell is used under harsh conditions, for example, when mounted on a vehicle.

It should be understood that the seal structure according to the second embodiment may be modified in various manners within such an extent that the object of the present invention can be achieved, for example, the following modifications may be made.

(A) In the second embodiment, the distance restricting portions 11 and 12 are provided at both of the inner and outer peripheral sides of the lip lines 7, however, they are not limited to this configuration, but may be provided at either side of the lip lines 7.

(B) In the second embodiment, the distance restricting portions 11 and 12 are provided along the entire periphery, however, they are not limited to this configuration, but may be provided along the periphery at a predetermined interval (intermittent disposition along the periphery).

(C) In the second embodiment, the thickness of the rubber sheet 6 is set to be same as the MEA 2 thickness, and the lip lines 7 and the distance restricting portions 11 and 12 are formed integrally on the front and rear faces of the rubber sheet 6 by increasing the thickness of the rubber sheet 6 at those parts, however, they are not limited to this configuration, but may be structured such that the thickness at the distance restricting portions 11 and 12 is set to be same as the MEA 2 thickness, the thickness of the lip lines 7 is set to be larger than MEA 2 thickness, and groove-like spaces 13 and 14 are formed between the lip lines 7 and the respective distance restricting portions 11 and 12.

Furthermore, the method of producing the seal structure according to the second embodiment is same as that of the first embodiment except that the mold 21 has a forming space for the distance restricting portions 11 and 12. Accordingly, the detailed description will be omitted to avoid duplication.

What is claimed is:

1. A seal structure for the fuel cell comprising;
    a membrane-electrode assembly (MEA) provided between a pair of separators;
    a rubber sheet provided on a plane extending from the MEA and at the outer peripheral side of the MEA;
    lip lines which have gasket configuration, are integrally formed on the respective surfaces of the rubber sheet and are closely contacted with the separators;
    rubber impregnated portions which are provided at the periphery of said MEA to integrate said rubber sheet and said MEA by a part of rubber constituting said rubber sheet being impregnated into gas diffusion layers (GDLs) constituting said MEA;
    GDL narrowed portions provided immediately inner peripheral side of said rubber impregnated portions in a plane with the MEA to define a rubber impregnated area of said rubber, and
    distance restricting portions formed integrally with the rubber sheet at both or at least one of inner peripheral side and outer peripheral side of the lip lines to define distance (c) between the separators by said portion being held by a pair of the separators when assembling a stack;
    wherein two distance restricting portions are formed at an inner peripheral side and an outer peripheral side of the lip lines;
    wherein the two distance restricting portions vertically project from and above the plane extending from the MEA; and
    wherein height (h2) of the distance restriction portions in the direction vertical to the plane extending from the MEA is smaller than height (h1) of the lip lines in the direction vertical to the plane extending from the MEA.

2. The seal structure according to claim 1, wherein the distance restricting portions are formed in a trapezoidal or rectangular sectional shape each having a flat end portion facing the separator.

3. The seal structure according to claim 1, wherein the distance restricting portions have the same height.

4. The seal structure according to claim 2, wherein the flat end portions are on a same plane.

5. The seal structure according to claim 1, wherein two distance restricting portions are formed at an inner peripheral side and an outer peripheral side of the lip lines; wherein height (h2) of the distance restriction portions in the direction vertical to the plane extending from the MEA is smaller than the height (h1) of the lip lines in the direction vertical to the plane extending from the MEA; and wherein the distance restricting portions are formed in a trapezoid or rectangular sectional shape each having a flat end portion facing the separator.

* * * * *